United States Patent Office 3,041,303
Patented June 26, 1962

3,041,303
MOLDING POWDER COMPRISING POLYSTYRENE, WHITE INORGANIC PIGMENT AND FINELY DIVIDED METAL POWDER
Edward A. Nelson, Springfield, Mass., assignor to Monsanto Chemical Company, St. Louis, Mo., a corporation of Delaware
No Drawing. Filed Aug. 3, 1955, Ser. No. 526,309
2 Claims. (Cl. 260—41.5)

This invention relates to injection molded polystyrene articles having a unique speckled appearance. More particularly, the invention relates to a polystyrene molding powder capable of being molded by injection molding methods into articles having a speckled appearance.

Polystyrene molding powders are generally colored with pigments prior to the molding operation either by dry blending or by roll milling the pigments into the polystyrene. In either case, when the molding powders are injection molded, the usual molding conditions produce a uniformly colored article. For many purposes it is desirable to produce a vari-colored effect and this is generally accomplished by dry blending two or more colored molding powders and then injection molding the blend. Such a process results in a series of striations which may have a pleasing appearance. However, for many articles it is desired to have a speckled effect in which tiny discrete particles of a contrasting color are uniformly visible in the surface of the finished article.

One object of this invention is to provide finished articles of polystyrene having a speckled effect in the surface thereof.

A further object is to provide a polystyrene molding powder which can be injection molded to provide a finished article having a speckled color effect in the surface thereof.

These and other objects are attained by blending polystyrene with a white inorganic pigment and a finely-divided metallic powder and thereafter injection molding the blended polystyrene.

*Example I*

Dry blend pulverulent polystyrene having a molecular weight of about 60,000–80,000 with 1% by weight of titanium dioxide and sufficient yellow pigment to produce a yellow pastel color in articles molded therefrom. Further blend the mixture with 0.5% of a finely-divided copper alloy, 96% of which is small enough to pass through a 40-mesh screen but too large to pass through a 60-mesh screen. Divide the blend into two parts. Injection mold one part directly into a mold in the form of a wall tile. Pass the second part through an extruder through a strand die. Cut the strand into particulate form and then injection mold the resulting particles into the same die. The wall tiles produced by either method have the appearance of pastel yellow granite, the copper alloy appearing in the finished article as relatively uniformly distributed grayish particles. Despite the fact that the original particles are all of substantially the same size and present a highly reflective surface, they appear in the finished product as particles of varying size and no glitter is observable from the reflecting surfaces.

*Example II*

Blend a pulverulent polystyrene with about 1.5% of titanium dioxide and sufficient green pigment to produce a pastel green color. Then blend into the mixture about 1% of a coated copper flake of such fineness that at least 50% passes through a 60-mesh screen and about 20% passes through a 100-mesh screen. The coating is advantageously a 0.0005-inch film of plasticized vinyl chloride polymer. Prepare a molded object such as wall tile by injection molding with and without prior extrusion. The products have a pleasing pastel color containing a uniform dispersion of the copper flake to give a speckled appearance simulating fine-grained granite.

*Example III*

Blend a pulverulent polystyrene containing about 6% by weight of a rubbery copolymer of butadiene and styrene with about 5% zinc oxide, a tinting amout of blue pigment, about 0.25% by weight of copper flake sufficiently fine to pass at least 50% through a 60-mesh screen and 0.5% of copper flake sufficiently small so that 96% passes through a 40-mesh screen but is retained on a 60-mesh screen. Injection mold the blend into an article such as a vase both with and without prior extrusion. The vases produced have a speckled blue pastel color simulating a coarse-grained blue granite.

The molding powders of this invention are prepared from the relatively hard polymers and copolymers of styrene having a molecular weight of about 40,000. Operative copolymers contain at least 50 mol percent of styrene with the balance being made up of one or more vinylidene compounds copolymerizable with styrene. Among the various co-monomers are alpha-methyl styrene, ring-substituted styrenes, acrylic esters, acrylonitrile, acrylic acids, maleic esters, etc. The polymers and copolymers may be used alone or blended with small amounts, i.e., up to 20% by weight, of rubbery polymers and copolymers such as the butadiene-styrene copolymers used to increase the impact strength of the styrene homopolymers. Small amounts of plasticizers or other conventional additives such as lubricants and stabilizers may be included in the molding powders.

To obtain the products of this invention, a small amount of a white pigment must be used. Titanium dioxide is preferred because of its greater whiteness and opacity but other white pigments such as zinc oxide, zinc sulfide, etc. may be used. The amount of white pigment may vary from 0.1 to 5.0% based on the weight of the resin. The white pigment may be the sole pigment or tinting amounts of colored pigments which may be organic or inorganic may be additionally incorporated into the blend to obtain particular colors to serve as a base for the speckled effect.

The speckling material should be a metallic flake of rather small particle size. The particle size should be fairly uniform and should be small enough that at least 50% will pass through a 40-mesh screen but should be large enough that about 50% is retained on a 100-mesh screen. Blends of flakes having different average particle sizes within this range may be used to vary the speckled effect from a fine-grained granite appearance to a coarse-grained effect similar to that found in many species of gneiss. The amount of metallic flake may be varied from 0.1 to 5.0% by weight based on the resin. The metallic flake is preferably copper or an alloy of copper having less of the characteristic reddish tinge of pure copper. However, flakes or powders of other metals and alloys such as aluminum, bronze and brass may be used to replace all or a part of the copper.

The speckled effect may be obtained with the above metal flakes or powders when used in an uncoated form or when coated with a lubricant such as a stearate. However, the most pleasing and decorative effect is attained when the flake or powder is coated with a thin film of a thermoplastic resin which is incompatible with the styrene resin. Advantageously, the flake is coated with a 0.0001 to 0.002-inch film of a plasticized vinyl chloride polymer or copolymer, which film may be colored with transparent dyes as desired. Other vinyl resins such as the polyvinyl acetals and particularly the polyvinyl butyrals and the polyvinyl esters such as polyvinyl acetate may be used to form the film on the metallic flake or powder.

Advantageously the white pigment and the metallic powder is blended dry with the styrene resin in pulverulent form in conventional apparatus such as a rotary tumbler until all ingredients are thoroughly intermingled. The blend may then be injection molded directly or it may be extruded to form the final product in continuous lengths or it may be extruded into rods or strands and then cut into a particulate form suitable for injection molding. Alternatively, the pigment and powder may be incorporated into the styrene resin by hot milling methods such as roll milling, Banbury mixing, etc.

Objects molded from the powders of this invention have a uniform speckled appearance in which the specks appear to be gray in color regardless of the metal used but having a tinge of a brighter color according to the metal used and the color, if any, of the coating on the metal. Substantially no bright reflections from the metallic surfaces can be observed when the particle size of the metal flake is within the limits set forth above.

The foregoing is given in illustration of this invention and it is obvious that many variations may be made therein without departing from the spirit and scope thereof.

What is claimed is:

1. A molding powder comprising (a) polystyrene blended with up to 20% by weight based on the weight of the polystrene of a rubbery butadiene-styrene copolymer, (b) from 0.1 to 5% by weight, based upon the combined weight of the polystyrene and the butadiene-styrene copolymer, of a white inorganic pigment, and (c) from 0.1 to 5% by weight, based upon the combined weight of the polystyrene and the butadiene-styrene copolymer, of a finely-divided metal powder, at least 50% of which passes through a 40-mesh screen and is retained by a 100-mesh screen.

2. A molding powder comprising polystyrene, from 0.1 to 5% by weight, based upon the weight of the polystyrene, of a white inorganic pigment and from 0.1 to 5% by weight, based upon the weight of the polystyrene, of a finely-divided metal powder, at least 50% of which passes through a 40-mesh screen and is retained by a 100-mesh screen; said metal powder being coated with a 0.0001 to 0.002-inch film of a thermoplastic vinyl resin which is incompatible with polystyrene and is selected from the group consisting of polyvinyl acetate, polyvinyl butyral and polyvinyl chloride.

References Cited in the file of this patent

UNITED STATES PATENTS

| | | |
|---|---|---|
| 2,493,020 | Osdal et al. | Jan. 3, 1950 |
| 2,591,904 | Zola | Apr. 8, 1952 |
| 2,593,943 | Wainer | Apr. 22, 1952 |
| 2,681,898 | Daly | June 22, 1954 |
| 2,711,968 | Conery et al. | June 28, 1955 |
| 2,716,190 | Baker | Aug. 23, 1955 |

FOREIGN PATENTS

| | | |
|---|---|---|
| 592,542 | Great Britain | Sept. 22, 1947 |